FREQUENCY BURST SYNCHRONIZATION CIRCUIT

Filed Nov. 16, 1964 3 Sheets-Sheet 1

INVENTOR.
RICHARD E. WILLIAMS
BY Hurvitz & Rose

Dec. 10, 1968 R. E. WILLIAMS 3,415,949

FREQUENCY BURST SYNCHRONIZATION CIRCUIT

Filed Nov. 16, 1964 3 Sheets-Sheet 2

INVENTOR.
RICHARD E. WILLIAMS
BY Hurvitz & Rose

FREQUENCY BURST SYNCHRONIZATION CIRCUIT

Filed Nov. 16, 1964 3 Sheets-Sheet 3

INVENTOR.
RICHARD E. WILLIAMS
BY
Hurvitz & Rose

United States Patent Office
3,415,949
Patented Dec. 10, 1968

3,415,949
FREQUENCY BURST SYNCHRONIZATION CIRCUIT

Richard E. Williams, Fairfax, Va., assignor to Dimension, Incorporated, Chantilly, Va., a corporation of Maryland
Filed Nov. 16, 1964, Ser. No. 411,221
2 Claims. (Cl. 178—69.5)

ABSTRACT OF THE DISCLOSURE

A burst responsive ringing circuit utilizing a gated vacuum tube driver having a parallel resonant tank circuit and a piezo-electric ringing circuit coupled to the tank circuit. The ringing circuit has a parallel resonant frequency equal to the frequency of the burst while the tank circuit has a resonant frequency detuned from the frequency of the burst.

The present invention relates to a frequency burst synchronization circuit, and more particularly, to a frequency burst synchronizing circuit of the type employed in color television receivers.

Present color television receivers in the U.S.A. use the National Television System Committee (NTSC) method for transmitting and processing color information. Hue information is carried by the phase of a 3.58 megacycle subcarrier measured relative to a frequency burst of 3.58 megacycles carried on the back porch of the horizontal line synchronization pedestal. The reference burst consists of eight cycles or so of the subcarrier frequency and nominally dwells in the horizontal retrace interval. The hue components of a transmitted scene must, on the other hand, be extracted while the scene is being painted on a display surface such as the face of a cathode ray tube. It is accordingly necessary that the horizontal burst be stretched out into a substantially continuous signal maintaining phase coherence with the burst. The extended signal can then be used at any time for phase comparison purposes.

Color saturation associated with a particular hue will be related to the amplitude of a component of the transmitted signal having the phase described by the hue. Since amplitude components yield saturation information and phase components yield hue information, it is important that the extended burst reference signal be rendered devoid of amplitude variations that could be mistaken for saturation information. This objective is typically achieved in existing receivers via a limiting circuit or through use of a phase-locked oscillator of constant output amplitude.

The frequency burst synchronization circuit must primarily function to convert the reference burst to a continuous wave-train of coherent phase. Other important features include low phase drift tendencies, high noise immunity, and ability to reject sound subcarrier interference. The latter subcarrier is typically at a frequency of 4.5 megacycles and is of concern because of its perseverance through the horizontal retrace interval. All of these requirements must preferably be attained in a low cost simple circuit of high reliability.

It is therefore an object of this invention to provide a frequency burst synchronization circuit which provides a relatively constant amplitude output without the use of a limiter.

It is still another object of the invention to provide a frequency burst synchronization circuit using a piezoelectric crystal in a parallel resonant mode and an off-frequency tuned driving circuit for high overall circuit gain.

It is yet another object of the present invention to provide a frequency burst synchronization circuit in which the phase of a steady-state output signal is controllably adjusted relative to the phase of an incoming burst signal, over the duration of the steady-state output signal.

It is a still further object of this invention to provide noise and sound subcarrier immunity in a piezoelectric crystal burst synchronization circuit.

It is still another object of this invention to provide a means for coupling a piezoelectric crystal filter to the source impedance of a driving circuit in a manner that tends to optimize power transfer from the driving circuit to the crystal during each incoming burst provided by said source and from the crystal to the output circuit in the intervals between bursts.

It is still a further object of this invention to provide a frequency burst synchronization circuit whose output implicitly disappears when reference burst signals are removed from its input.

All and incidental objects of this invention will become apparent upon a reading of the following specification and an inspection of the drawings in which.

Figure 1:
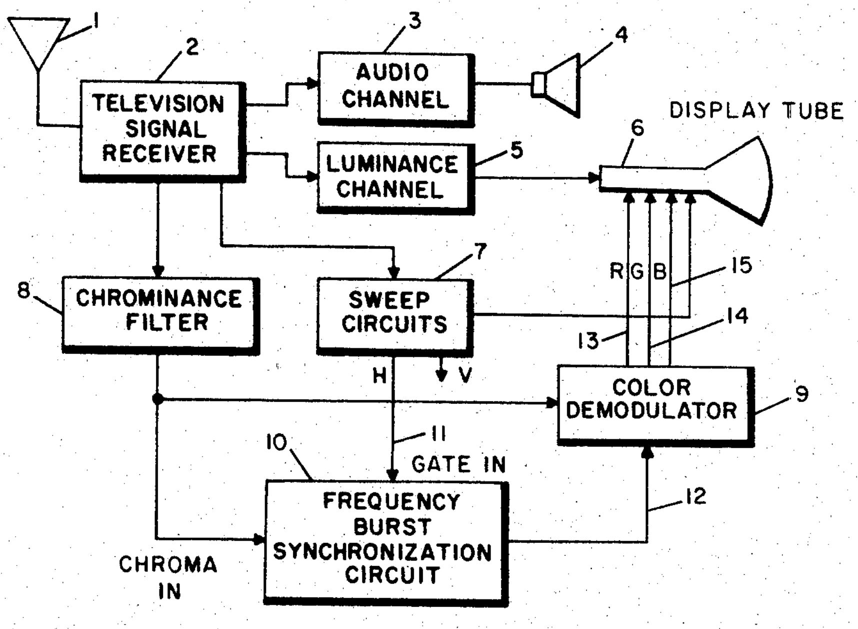
FIGURE 1 shows a block diagram of a typical color television receiver in which has been included a block serving to isolate the functions provided according to the teachings of the present invention.

FIGURE 1 shows the major functional elements of a typical color television receiver presently in widespread usage. The incoming color television signal reaches the antenna 1 and is applied to the television signal receiver 2. The television signal receiver 2 performs the functions of first detection, intermediate frequency amplification, and second detection in a manner described, for example, by R. G. Clapp, et al., in the Proceedings of the I.R.E., Mar. 1956, pp. 297–298.

The output of the television signal receiver 2 is then the recovered color television signal information which also includes the sound which has been transmitted on a frequency-modulated carrier 4.5 megacycles removed from the video carrier.

The audio channel 3 is comprised of an audio detector and amplifier which employs, for example, the well-known principles of intercarrier sound. After suitable amplification, the sound information is provided to the loudspeaker 4. The luminance or monochrome information is processed through a luminance channel 5 consisting of second detector and video amplifier to a display tube 6. Elements 1 through 6, together with sweep circuits 7 and a power supply not shown, comprise in essence a complete monochrome receiver.

The luminance channel 5 in a typical color receiver departs slightly from its counterpart in a monochrome receiver with respect to bandwidth and time delay. Such departures do not have a direct influence on the present invention, however, and accordingly will not be further described.

The color television signal is passed through the chrominance filter 8 whose primary function is to isolate the 3.58 megacycle color subcarrier and sidebands associated therewith. The latter signal components, or chroma signal, are applied to a color demodulator 9 and additionally to the frequency burst synchronization circuit 10. The synchronization circuit 10 is gated on by a horizontal pulse derived from the sweep circuits 7 via bus 11. The synchronization circuit 10 thus samples the chroma signal derived from the chrominance filter 8 roughly during the horizontal retrace interval and relatively exclusively processes the 3.58 megacycle reference burst occurring during the back porch of the horizontal synchronization pedestal.

The teachings of the present invention reside in the frequency burst synchronization circuit 10, especially as applied to a color television system, and serve to convert the reference burst into a substantially continuous wave train of phase coherence for use by the color demodulator 9 via bus 12. The color demodulator 9 serves to detect the phase of picture hue information processed through the chrominance filter 8 by comparing the phase to the reference signal derived from the burst synchronization circuit 10 and bus 12. The detected output of the color demodulator 9 can consist of one or more buses 13, 14, 15, which carry the envelopes of chrominance hues detected along particular phase axes. Each phase axis chosen corresponds to a particular hue such as red, green, or blue.

The signals on a color bus 13 are used to emphasize or de-emphasize corresponding colors on the display tube 6 in spatial juxtaposition with the monochrome components of the picture derived from the luminance channel 5. The presently most widely used form of the frequency burst synchronization circuit 10 consists of a phase-locked oscillator such as that described by D. Richman, Proceedings of the IRE, Jan. 1954, pp. 288 to 299. The phase-locked oscillator yields an output of extremely constant amplitude but requires automatic phase and frequency control circuits and additionally necessitates the use of a "color killer" elsewhere in the color receiver to avoid certain interference effects between high frequency video components and the steady-state signal on bus 12 during monochrome transmissions.

Figure 2:
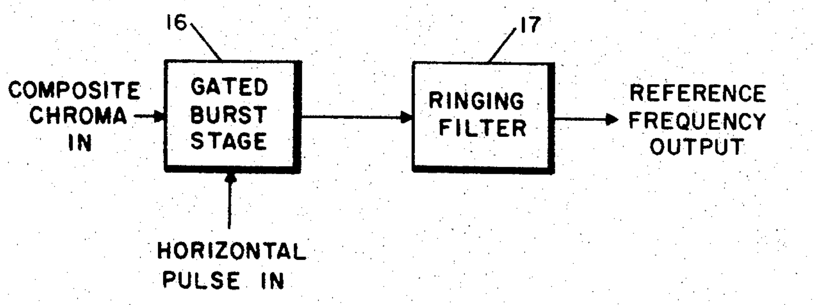
FIGURE 2 shows a simplified block diagram of a frequency burst synchronization circuit.

A well-known but not widely used circuit that circumvents the necessity for a color killer circuit is that shown in FIGURE 2. A ringing filter 17 is substituted for an oscillator so that the reference frequency bursts derived from the gated burst stage 16 must appear reiteratively and often in order for a reference frequency output to persist on the output bus 12. The ringing filter 17 is typically a piezoelectric crystal operating at an effective Q of 20,000 or so. The gated burst stage 16 merely serves to isolate the reference bursts occurring on the horizontal pedestals so that the ringing filter 17 will lock in phase to the bursts. The circuit of FIGURE 2 has not met with wide usage because it must typically be followed by amplification and limiting stages to attain a constant amplitude output. When a piezoelectric crystal is used as the ringing filter 17, its output voltage amplitude is typically much less than one volt peak-to-peak. Inexpensive limiting circuits prefer to work at higher signal amplitudes and thus both amplifying and limiting functions must follow.

Figure 4:
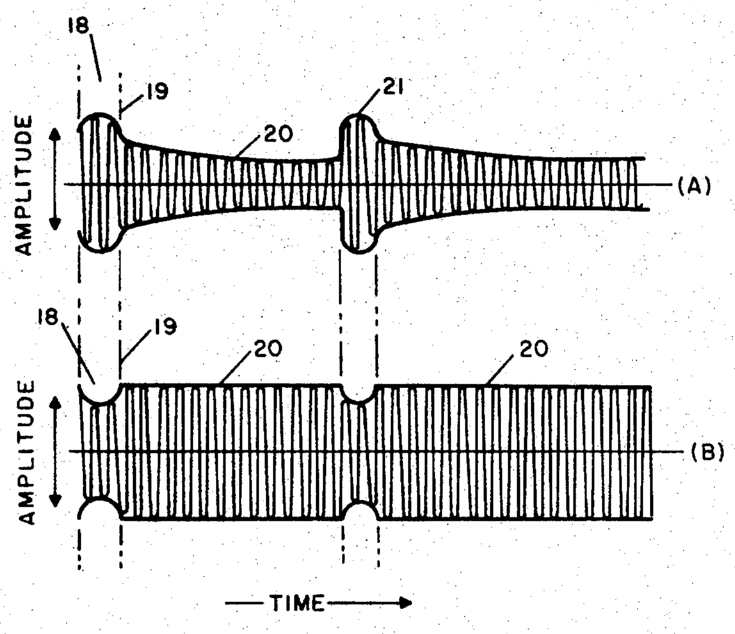
FIGURE 4 shows the output of a conventional series-resonant ring-out circuit (A) and the output of the present invention (B).

The typical output wave form of the circuit of FIGURE 2 is that of FIGURE 4, graph A. During the horizontal burst interval 18, the ringing filter 17 passes the burst with relatively low attenuation. Upon cessation, 19, of the burst 18, the piezoelectric ringing filter 17 continues producing a damped wave train 20 which persists until the arrival of the next horizontal burst 21. The large variations in the envelope, FIGURE 4, graph A, call for subsequent amplitude limiting and have accordingly restricted the commercial use of the circuit of FIGURE 2 despite its advantage in eliminating the need for a color killer circuit.

Figure 3:
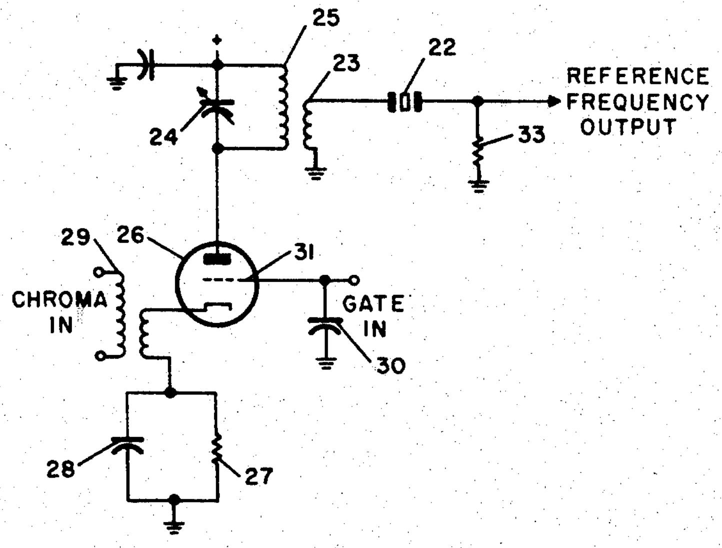
FIGURE 3 shows a schematic diagram of a conventional series resonant piezoelectric crystal utilized in a burst ring-out circuit.

Before entering upon a discussion of the teachings of the present invention and of circuits which can operate according to these teachings, it is desirable to examine a schematic diagram of a circuit of the ringing filter type and ascertain the specific reasons for the attendant output amplitude variations as shown in FIGURE 4, graph A. A typical embodiment is shown in FIGURE 3. The operation of such a circuit is very well known and is discussed at length in such publications as, for example, the report by Clapp et al., in the March 1956, Proceedings of the I.R.E., on page 305. In such a circuit the piezoelectric crystal 22 is used in the series-resonant mode and is coupled via an impedance matching winding 23 to the plate tank 24, 25 of a burst gate tube 26. The tube 26 is normally cathode biased to approximately cutoff by means of the voltage developed across the biasing network consisting of a resistance 27 and a by-passing capacitor 28. In the particular embodiment shown, the tube 26 operates as a grounded grid stage with input cathode injection of the chroma signal via transformer 29. The grid is grounded to the chroma signal by action of bypass capacitor 30. The horizontal gating pulse is positive going and serves to gate the tube 26 on when it is applied to the grid 31. Although the chroma signal consisting of the 3.58 megacycle subcarrier and sidebands thereof is continuously applied to the cathode via transformer 29, the plate tank 24, 25 sees only the reference burst (in absence of crystal ring-out) because the tube 26 is cutoff at all times except during the horizontal pulse gating action on the grid 31.

Figure 5:
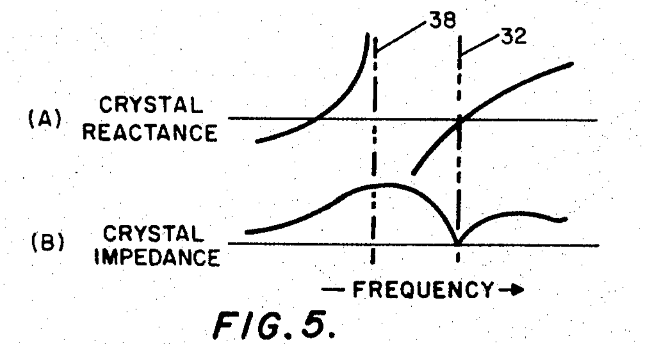
FIGURE 5 shows portions of typical curves of crystal reactance and impedance versus frequency.

The piezoelectric crystal 22 is operated in its series-resonant mode corresponding to locus 32 of FIGURE 5. The impedance is close to zero at this point. In this mode, the crystal passes the horizontal burst with very little attenuation and produces across the load resistance 33 of FIGURE 3 the burst amplitude occurring in interval 18 of FIGURE 4, graph A. At cessation of the burst designated 18 in FIGURE 4, the piezo-electric crystal 22 continues its mechanical vibration developing a corresponding voltage across its terminals. This voltage is distributed across the shunting elements comprised of resistance 33 in series with inductance 23. Since the output voltage is read across resistance 33, it is important that its impedance be rendered as high as possible relative to that of inductance 23, yet it must be low enough to exploit the high Q of the crystal 22. The plate tank 24, 25 is typically tuned to parallel-resonance at the color subcarrier frequency. It thus has the undesirable effect of reflecting a maximum impedance to winding 23 at the crystal 22 ring-out frequency. In addition, since the reflected impedance is substantially resistive it is dissipative, lowering the effective Q and thus the ring-out capabilities of the crystal circuit. The above-mentioned factors including: the voltage divider action occurring between the load resistance 33 and the resistive impedance of coil 23, the low-attenuation transfer of the burst to the output via the low series-resonant impedance of the piezoelectric crystal 22, and the tendency for lowered effective Q because of the resistive nature of the circuit during ring-out, combine to yield an output envelope similar to that of FIGURE 4, graph A, unless the step-down ratio between primary winding 25 and secondary winding 23 is very large. In the latter case the induced voltage across winding 23 is very low, resulting in low overall gain.

Figure 6:
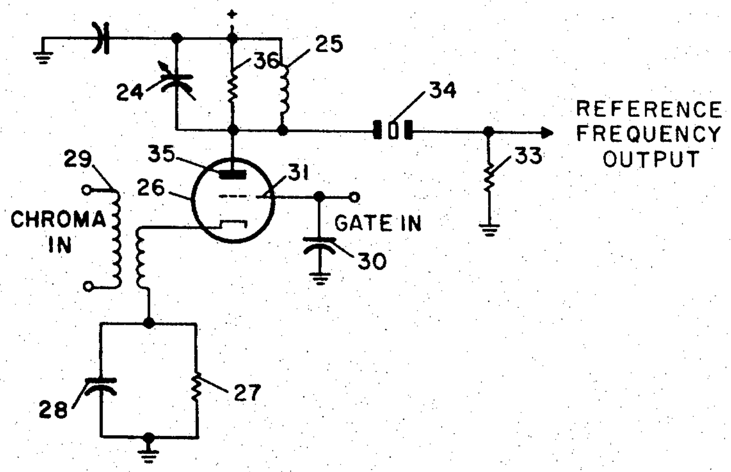
FIGURE 6 shows a schematic embodiment of a circuit operating according to the teachings of the present invention.

A frequency burst synchronization circuit which functions according to the teachings of the present invention is illustrated in FIGURE 6. In the present invention, the burst gate tube 26 serves to gate the reference burst derived via cathode coupling transformer 29 in the same manner as that described relative to FIGURE 3; i.e., the tube is brought out of the cutoff condition imposed by the cathode bias network 27, 28 by a positive-going horizontal pulse applied to the grid 31 from bus 11 of FIGURE 1. Thus, if one temporarily ignores the ring-out signal of the piezoelectric crystal 34, the waveform as seen at the plate 35 of the burst gate stage 26 will consist primarily of the reference burst signal. The plate tank circuit 24, 25 represents a very low impedance to Fourier frequencies contained in the horizontal gating pulse applied to the grid 31 but a fairly high impedance to the 3.58 megacycle color sub-carrier. The plate tank 24, 25 is not tuned to the color subcarrier frequency 3.58 megacycles but instead is tuned somewhat low, typically to 3.0 megacycles or so. Its Q is lowered by means of a damping resistor 36 and the effective shunting resistance imparted by the tube 26 during the horizontal gating pulse interval. The tank circuit 24, 25, 36 presents an impedance of several thousand ohms to the reference burst frequency, a very low impedance to the 4.5 megacycle sound subcarrier, and a very low impedance to the frequency components associated with the horizontal gating pulse. The rejection of the 4.5 megacycle sound subcarrier is of particular importance since this signal is normally present during the horizontal pulse. Inadequate rejection can lead to loss of phase coherence in the ring-out interval.

The piezoelectric crystal 34 is operated in its parallel resonant mode designated as locus 38 in FIGURE 5 despite the series connection of the circuit. Thus, it represents a high impedance to the color subcarrier at 3.58 megacycles during the horizontal burst interval 18 of FIGURE 4, graph B. The resonant impedance of the crystal 34 is sufficiently high so that its impedance in parallel with the plate tank 24, 25, 36 (typically an impedance of 2000 ohms, or so) represents a good match to the tube 26 during the horizontal burst interval. This is particularly the case because the dynamic plate resistance of the tube 26 is quite low during the close-to-zero-bias status of the tube during the horizontal gating interval. Since the piezoelectric crystal 34 represents a high impedance during the reference burst, a relatively low output is seen across the output load consisting of resistance 33 (typically 1500 ohms or so) despite the relatively large voltage swing across the tank 24, 25, 36. The output amplitude is observed to slightly dip during the reference burst interval as shown in FIGURE 4, graph B. At the cessation of the gating interval 19, the crystal continues to ring-out into its load consisting of resistance 33 in series with the impedance from the input end of the crystal 34 to ground. The latter impedance is comprised of the off-resonance impedance of the plate tank 24, 25, 36 shunted by the high plate resistance of the tube 26 which is close to cutoff. Since the plate tank 24, 25 is detuned at the color subcarrier frequency, 3.58 megacycles, the crystal 36 does not drop as much of its output amplitude excursion across the tank as would be the case if it had been tuned to resonance. Additionally, since the tank 24, 25 is largely reactive rather than resistive, large circulating currents are not introduced into the tank circuit 24, 25 and the Q of the crystal 34 is maintained at a high level during ring-out. The ring-out between horizontal pulses is thus maintained at a nearly constant amplitude designated 20 in FIGURE 4, graph B.

In the conventional circuit of FIGURE 3, the load resistance 33 must be held to a low value (500 ohms or less) to prevent spoiling the series-resonant Q of the crystal 22. Since the output of the circuit normally feeds a fairly high impedance such as a grid network, additional matching transformers or the like are required to avoid amplitude losses. The high value for resistance 33 allowable in the present invention tends to implicitly avoid losses of this type without additional matching devices.

The present invention embodied in the circuit of FIGURE 6 superficially appears similar to the well-known circuit of FIGURE 3, but it is important to note that the present invention would not work properly if, for example, the plate tank 24, 25 were tuned to the color subcarrier frequency 3.58 megacycles, nor would it work if the crystal 34 operated in the series-resonant mode. Other differences lie in the much greater overall gain of the present invention with a constant amplitude output during regions 20 of FIGURE 4, graph B. The regions 20 are the intervals of importance in the synchronous demodulation processes of the color demodulator 9 of FIGURE 1.

Figure 7:
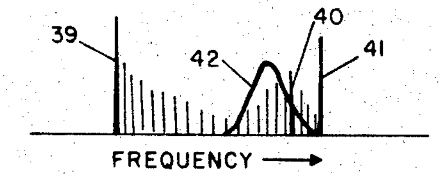
FIGURE 7 shows a typical power frequency spectrum of a composite color television signal.

A typical power frequency spectrum of a color transmission is as shown in FIGURE 7 wherein spectral line 39 represents the signal carrier frequency, line 40 the 3.58 megacycle color subcarrier, and line 41 the 4.5 megacycle sound subcarrier. The typical location and response curve of the plate tank 24, 25 of FIGURE 6 is designated as 42 in FIGURE 7. Its displacement toward the lower frequency side of the color subcarrier 40 enables greater rejection of sound interference stemming from spectral line 41 and sidebands thereof. Tuning of the plate tank by varying capacitors 24 or inductance 25 implicitly imparts a phase shift to the reference frequency output in comparison to the phase carried upon the reference burst. The "hue" setting of the color television receiver is readily accomplished by the adjustment of capacitance 24 or inductance 25. Despite the relatively constant amplitude of the output derived from the present invention as shown in FIGURE 4, graph B, cessation of the horizontal burst as would occur, for example, in a monochrome transmission, will result in a dying out of the crystal 34 output and obviate the need for a color killer circuit.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A system for generating a phase coherent long term signal in response to a burst signal, wherein said long term signal and said burst signal are of the same frequency, comprising a source of said burst signal, a low Q tank circuit detuned from said frequency effectively connected in cascade to said source of said burst signal, a high Q resonator parallel resonant at said frequency effectively connected in cascade with said low Q tank circuit, and a load circuit connected to said high Q resonator, wherein is provided means comprising a vacuum tube applying said burst signal to said low Q tank circuit, said vacuum tube having an anode, said low Q tank circuit being connected to said anode, means coupling said high Q resonator to said anode, the impedances of said low Q tank circuit and said high Q resonator taken in parallel presenting a good match to the anode impedance of said vacuum tube during said burst signal, wherein said vacuum tube is normally biased substantially into non-conductivity, and means rendering said vacuum tube highly conductive only during said burst, whereby at the termination of said burst said high Q resonator sees substantially only the low impedance of said low frequency tank circuit at its driving end.

2. The combination according to claim 1 wherein said load circuit is essentially a resistance having a high value.

References Cited

UNITED STATES PATENTS

| | | | |
|---|---|---|---|
| 2,751,430 | 6/1956 | Kelly | 178—5.4 |
| 2,897,260 | 7/1959 | Larky | 178—5.4 |
| 2,898,399 | 8/1959 | Hinsdale et al. | 178—5.4 |

ROBERT L. GRIFFIN, *Primary Examiner.*

R. BLUM, *Assistant Examiner.*

U.S. Cl. X.R.

178—5.4; 331—158, 166, 173